United States Patent [19]

Kruger et al.

[11] E Re. 30,171

[45] Reissued * Dec. 18, 1979

[54] MULTICONFIGURATION IONIZATION SOURCE

[75] Inventors: William P. Kruger, Los Altos Hills; John A. Michnowicz, Santa Clara, both of Calif.

[73] Assignee: Hewlett-Packard Company, Palo Alto, Calif.

[ * ] Notice: The portion of the term of this patent subsequent to May 27, 1992, has been disclaimed.

[21] Appl. No.: 914,660

[22] Filed: Jun. 12, 1978

Related U.S. Patent Documents

Reissue of:

[64] Patent No.: 3,992,632
Issued: Nov. 16, 1976
Appl. No.: 568,499
Filed: Apr. 16, 1975

U.S. Applications:

[63] Continuation of Ser. No. 391,721, Aug. 27, 1973, Pat. No. 3,886,365.

[51] Int. Cl.[2] ..... H01J 27/00

[52] U.S. Cl. ..... 250/423 R; 250/427

[58] Field of Search ..... 250/423, 424, 427, 288, 250/281, 282, 289; 313/359, 360

[56] References Cited

U.S. PATENT DOCUMENTS

| | | | |
|---|---|---|---|
| 3,115,591 | 12/1963 | Brunnee | 250/423 |
| 3,187,179 | 6/1965 | Craig | 250/289 |
| 3,355,587 | 11/1967 | Janckel | 250/427 |
| 3,405,263 | 10/1968 | Wanless et al. | 250/285 |
| 3,553,452 | 1/1971 | Tiernan | 250/427 |
| 3,555,272 | 1/1971 | Munson | 250/424 |
| 3,582,645 | 6/1971 | Brunnee et al. | 250/423 |
| 3,984,692 | 10/1976 | Arsenault | 250/423 |

FOREIGN PATENT DOCUMENTS 1338213 11/1973 United Kingdom .

OTHER PUBLICATIONS

"Studies in Chemical Ionization Mass Spectrometry", Michnowicz et al., *Organic Mass Spectrometry*, 1970, vol. 4, pp. 481–492.

"A Chemical Ionization Mass Spectrometer Source" Fales et al., *Rev. of Sci. Ins.*, vol. 42, No. 11, Nov. 1971, pp. 1578–1584.

"Ionization Sources in Mass Spectrometry" Chait, *Anal. Chem.*, vol. 44, No. 3, Mar. 1972, pp. 77A–88A, 91A.

*Primary Examiner*—Bruce C. Anderson
*Attorney, Agent, or Firm*—Michael L. Sherrard

[57] ABSTRACT

This is an ion-producing source having a distinct chemical ionization configuration and a distinct electron impact configuration. In this source, a hollow chamber including an ion source and a source of sample molecules receives a hollow, slidable cylindrical member having a chemical ionization chamber within it. Orifices in the chamber and the cylindrical member connect the chemical ionization source chamber to the electron source and to the sample molecule source when the cylindrical member is pulled to one position. When the cylindrical member is pulled to another position, the slidable cylindrical member and the inside walls of the chamber define the ionization region to which the electron source and the sample molecule source are directly connected. By moving the cylindrical member, the ionization source can be changed from a chemical ionization source to an electron impact source.

9 Claims, 2 Drawing Figures

MULTICONFIGURATION IONIZATION SOURCE

Matter enclosed in heavy brackets [ ] appears in the original patent but forms no part of this reissue specification; matter printed in italics indicates the additions made by reissue.

CROSS REFERENCE TO RELATED APPLICATION

This is a continuation of application Ser. No. 391,721 filed Aug. 27, 1973 now U.S. Pat. No. 3,886,365.

BACKGROUND OF THE INVENTION

Ion sources are employed with mass spectrometers in the analysis of substances. Commonly used sources are the electron impact source and the chemical ionization source. The first one has a large electron entrance, a large ion exit, and an ionization region where the incoming electrons fragment as well as ionize vapor molecules thus providing a large quantity of information which does not necessarily give clear indication of the identity of a substance. The chemical ionization source has, on the other hand, a small electron entrance, a small ion exit, and an ionization region where the pressure can be maintained at such levels that ion-molecule collisions are extremely likely to occur, such collisions leading to ready identification of the molecular weight of a substance.

Operation of a mass spectrometer alternately with electron impact and chemical ionization sources has required many hours of down time during which the operation of the spectrometer stops. An object of this invention is to permit changing between the electron impact and the chemical ionization configurations with minimal interruption of operation of the mass spectrometer.

BRIEF SUMMARY OF THE INVENTION

According to the preferred embodiment, this invention provides an ionization source with two distinct ionization chambers, one which operates as an electron impact ionization source and the other as a chemical ionization source. The invention may be used with a mass spectrometer and changes in configuration can be made easily and quickly. The main elements of the invention include a hollow chamber having a plurality of orifices transverse to the longitudinal axis of the chamber. One of the orifices contains an electron source, and another one is a gaseous sample inlet. A hollow slidable cylindrical member having smaller transverse orifices than those in the hollow chamber fits inside the hollow chamber. At one of its ends, the cylindrical member has two electrode inserts separated from each other along the longitudinal axis and defining a first ionization region between them and the inside walls of the hollow cylindrical member. This region is connected to the sample inlet orifice and to the electron source orifice when the hollow cylinders is in a first position. A second ionization region is defined by the inside walls of the hollow chamber, the outer electrode insert of the cylindrical member, and the open end of the hollow chamber, when the cylindrical member is in a second position. This second region is directly connected to the electron source orifice and to the sample inlet. In this manner, when the cylindrical member is in the first position, the source operates as a chemical ionization source and when the cylindrical member is in the second position, the source operates an an electron impact source. The position of the cylindrical member can be changed quickly and easily by simply pushing or pulling a handle attached to the cylinder.

DESCRIPTION OF THE PREFERRED EMBODIMENT

Figure 1:
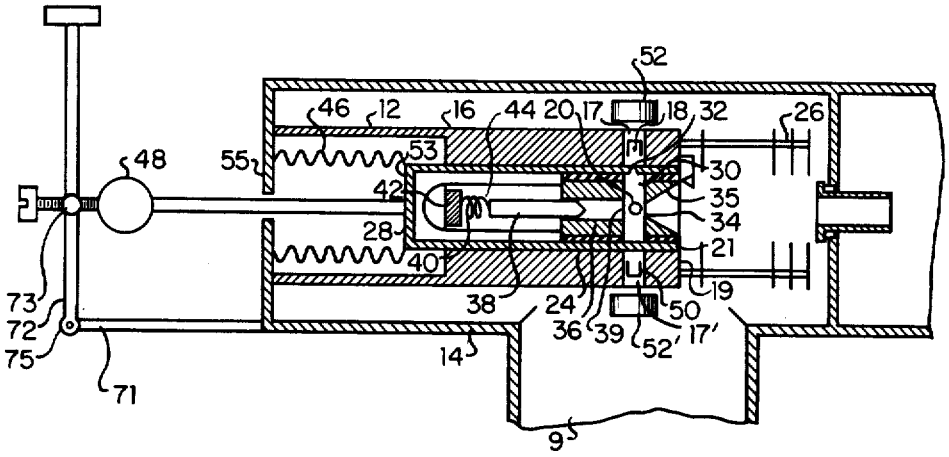
FIG. 1 shows a cross-sectional view of the preferred embodiment of the present invention in the chemical ionization configuration.
Figure 2:
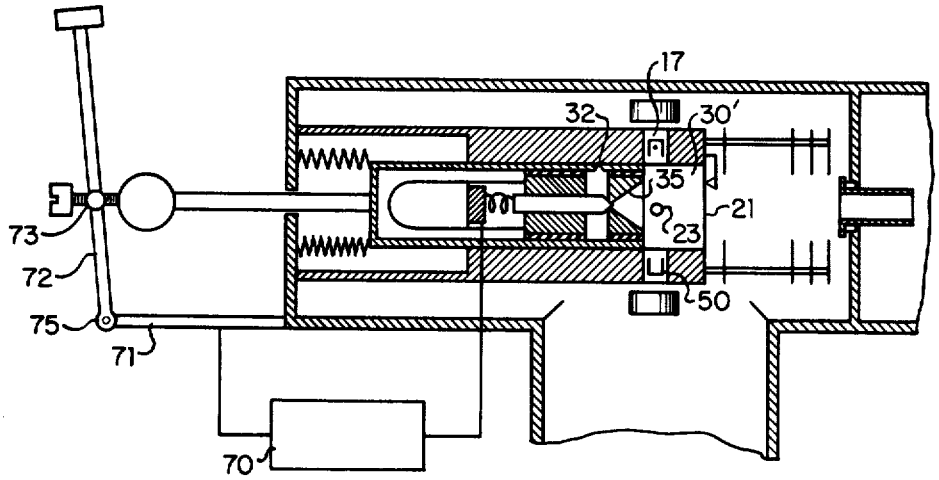
FIG. 2 shows the apparatus of FIG. 1 in the electron impact configuration.

FIGS. 1 and 2 show a vacuum envelope 14 which is connected to an ordinary vacuum pump through a port 9 for evacuating air from the envelope. An ion chamber 16, which may be a stainless steel tube, is supported within envelope 14 by a support member 12 and has orifices 17, 17' and 23 transverse to its longitudinal axis. Orifice 17 contains a filament 18 near the periphery of ion chamber 16 and near an end 19 of ion chamber 16. Orifice 23 is an inlet for samples to be ionized. The ion chamber 16 has a preferably cylindrical bore 24 along the longitudinal axis. Filament orifice 17 intersects bore 24 near end 19.

A hollow member 28 fits slidably inside bore 24, which member may be made of stainless steel tubing. Electrode inserts 35 and 36 are supported by and fastened to the inside of slide member 28 by insulators preferably made of ceramic. Insert 35 is located at end 21 of member 28 and has a passage 34 through it. Insert 36 is spaced apart from insert 35 and has a passage 39 through it. A connector 38 passes through passage 39 and engages passage 34 in insert 35 when member 28 has been moved to the left as shown in FIG. 2. A spring 40 attaches connector 38 to a base block 42, and this block is in turn affixed to but electrically insulated from chamber 16. Slide member 28 has a slot 44 through which base block 42 passes. The external surface of hollow member 28 is preferably hardened to prevent galling or binding with chamber 16. A handle 48 attaches to end 53 of hollow member 28 and is used to displace this member from the first position to the second position as shown in FIGS. 1 and 2 respectively. A bellows 46 surrounds handle 48 and connects the end 53 of hollow member 28 with a wall 55 of vacuum envelope 14. A support member 12 surrounds the bellows 46 and affixes the chamber 16 to wall 55. A pivot axle 75 between a support member 71 and an arm 72 permits pulling or pushing arm 72, which is connected to handle 48, for placing cylinder 28 in either the chemical ionization configuration as shown in FIG. 1 or the electron impact configuration as shown in FIG. 2. Arm 72 is connected to handle 48 by a vernier screw arrangement 73 for making fine alignment adjustments of electron passage 32 with filament orifice 17.

As shown in FIG. 1, electrode inserts 35 and 36 and the inner periphery of hollow member 28 define a first ionization region 30 when hollow member 28 is to the right, as in FIG. 1. A second ionization region 30' is defined by the interior walls of chamber body 16, the electrode insert 35 to the left, and the open end 19 of chamber 16 to the right. A passage 32 through the wall of hollow member 28 permits entry of electrons into the ionization region 30 from orifice 17 when hollow member 28 is to the right. A sample inlet 23 through the walls of ion chamber 16 permits entry of an ionization sample into ionization region 30' when cylinder 28 is to the left as shown in FIG. 2. Sample inlet 23, and sample inlet 20 passing through the walls of hollow member 28, permit entry of an ionization sample into ionization region 30, when hollow member 28 is to the right as shown in FIG. 1. A passage 34 permits exit of ions from the ionization region 30 to an ion lens assembly 26. Both passages 32 and 34 may have a conical configuration to improve entry of the electrons through the first passage and exit of the ions through the second passage. Passages 32 and 34, the electron entrance and ion exit passages respectively of the chemical ionization chamber, are much smaller than the respective passages 17 and 21 of the electron impact chamber. The smaller size of passages 32 and 34 permits maintaining a higher pressure in ionization region 30 than in ionization region 30'.

Magnets 52 and 52' are located adjacent to filament 18 and to an electron collector 50, respectively, which is disposed on the periphery of chamber 16 diametrically opposed to filament 18. The magnets direct an electron beam from the filament to the collector. The ion lens assembly 26, adjacent to end 19, extend away from chamber 16 and, when the appropriate potentials are applied, focuses ions emerging from ionization regions 30 and 30' into a mass filter for analysis (not shown).

A potential source 70 is connected to insert 35 by connector 38 to maintain insert 35 at a potential for repelling ions when the hollow member 28 is to the left, as shown in FIG. 2. When the hollow member 28 is to the right, connector 38 engages only insert 36 to maintain a repelling potential on this insert, which insert now becomes a repeller electrode.

When the hollow cylindrical member is to the left, the ionization source is operating in the electron impact configuration where the pressure inside ionization region 30' is about $10^{-6}$ Torr; the ionization electrons have energies of about 70 eV; and mean-free-paths of about $2\times10^{3}$ inches. The electrons in this configuration fragment the sample molecules and produce many ions whose mass-to-charge ratios do not necessarily correspond to the molecular weight of the sample. When the hollow cylindrical member is to the right, the ionization source is operating in the chemical ionization configuration where the pressure in ionization region 30 is up to 1.0 Torr; the ionization electrons have energies of about 100 to 500 eV; and short mean-free-paths of about $2\times10^{-3}$ inches. The electrons in this configuration do not fragment the sample molecules as much as in the electron impact configuration, but produce an abundance of ions whose mass-to-charge ratio corresponds more accurately to the molecular weight of the sample.

We claim:

[1. A multiconfiguration multimode ionization source comprising:

a vacuum tight envelope;

means mounted within said envelope and defining a chamber having a plurality of openings;

electron source means disposed exterior to the chamber for supplying electrons to the chamber, through a first of said openings;

sample inlet means for supplying a gaseous sample through a second of said openings for reaction with the electrons inside the chamber to create ions, said ions exiting through a third of said openings; and aperture control means for changing the size of said first and third openings to change the pressure in the chamber, thereby to change the operating mode of the source from a first to a second ionization mode.]

[2. The apparatus of claim 1, wherein the first ionization mode is a chemical ionization mode and the second ionization mode is an electron impact ionization mode.]

*3. An ionization source comprising:*

*a vacuum tight envelope;*

*a chamber having walls surrounding an internal cavity and mounted within the envelope, said chamber having a plurality of openings;*

*an electron source disposed exterior to the chamber for supplying electrons to the chamber through a first of said openings;*

*sample inlet means for supplying a gaseous sample for reaction with the electrons inside the chamber to create ions, said ions exiting through a second of said openings; and*

*aperture control means for cooperatively changing the size of the first and second openings for changing the pressure of the sample in the chamber.*

*4. An ionization source according to claim 3 wherein:*

*the aperture control means comprises a movable member within the chamber, said member having an electron opening smaller than said first opening and also having an ion opening smaller than said second opening; and in the operation of said ionization source,*

*said electrons from the source can pass through the electron opening and the first opening when said movable member is in the first position;*

*said ions in the cavity can pass through the ion opening and the second opening when the movable member is in the first position; and*

*said electrons can pass through only the first opening and said ions pass through only the second opening when the movable member is in a second position.*

*5. An ionization source according to claim 4 wherein the movable member comprises a hollow slidable cylinder having an ion exit and a handle end.*

*6. An ionization source according to claim 5 wherein there is provided:*

*a bellows having a first end attached to the handle end of the cylinder and a second end attached to a wall of the vacuum tight envelope; and*

*a handle surrounded by the bellows, one end of said handle being attached to said handle end of the cylinder, the other end of the handle protruding through said vacuum tight envelope wall.*

*7. An ionization source according to claim 6 wherein an electron collector is provided opposite the electron source, and magnets are disposed adjacent the electron source and the electron collector to direct the electrons from the electron source.*

*8. An source according to claim 7 wherein an ion lens assembly is attached to one end of the chamber adjacent the electron source for focusing ions into a utilization device.*

*9. An ionization source according to claim 8 wherein a vernier adjustment screw is attached to said handle for making fine adjustments in the position of the cylinder for aligning the electron opening with the electron source.*

*10. An ionization source according to claim 5 further including ion repelling means comprising:*

*first and second repeller electrodes mounted in and electrically insulated from the hollow slidable cylinder; and*

*a connector connectable to a source of potential for making an electrical connection with the first repeller electrode when the slidable cylinder is in the first position and with the second repeller electrode when the slidable cylinder is in the second position.*

*11. An ionization source according to claim 10 wherein said ion opening is in the second repeller electrode.*

* * * * *